United States Patent
Applegate et al.

(10) Patent No.: US 7,388,842 B1
(45) Date of Patent: Jun. 17, 2008

(54) METHOD AND APPARATUS FOR EFFICIENT ROUTING OF VARIABLE TRAFFIC

(75) Inventors: David Lee Applegate, Maplewood, NJ (US); Edith Cohen, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 833 days.

(21) Appl. No.: 10/797,762

(22) Filed: Mar. 10, 2004

Related U.S. Application Data

(60) Provisional application No. 60/455,462, filed on Mar. 13, 2003.

(51) Int. Cl.
*H04L 12/28* (2006.01)
(52) U.S. Cl. .................. 370/238; 370/252; 370/255; 370/401; 709/220; 709/241
(58) Field of Classification Search .............. 370/60, 370/84, 85, 94.1, 238, 252, 254, 316, 356, 370/394, 253, 255, 400, 401; 709/238, 239, 709/240, 241, 270, 220
See application file for complete search history.

(56) References Cited

U.S. PATENT DOCUMENTS

| | | | | |
|---|---|---|---|---|
| 5,426,635 A | * | 6/1995 | Mitra et al. | 370/229 |
| 5,740,164 A | * | 4/1998 | Liron | 370/316 |
| 6,098,107 A | * | 8/2000 | Narvaez-Guarnieri et al. | 709/239 |

OTHER PUBLICATIONS

Applegate, "Making Intra-Domain Routing Robust to Changing and Uncertain Traffic Demands: Understanding Fundamental Tradeoffs," SIGCOMM'03, Aug. 25-29, 2003, Karlsruhe, Germany.

* cited by examiner

*Primary Examiner*—Ricky Q. Ngo
*Assistant Examiner*—Henry Lam

(57) ABSTRACT

A method and apparatus for provide highly efficient traffic routing for a wide range of possible traffic matrices (TM) in an intra-domain network. That routing optimally balances the traffic loads over a range of traffic matrices so as to minimize the deviation for any particular traffic matrix from the optimal routing. Such a routing provides a guaranteed performance ratio against the best possible network routing. The invention utilizes a method of optimally configuring a traffic network based on solving a linear program to obtain the optimal routing, and then configuring the routing on the network accordingly.

5 Claims, 5 Drawing Sheets

METHOD AND APPARATUS FOR EFFICIENT ROUTING OF VARIABLE TRAFFIC

CROSS-REFERENCE TO RELATED APPLICATIONS

This application claims benefit of U.S. provisional patent application 60/455,462, filed Mar. 13, 2003 which is herein incorporated by reference.

BACKGROUND OF THE INVENTION

1. Field of the Invention

The present invention relates to intra-domain traffic engineering. More specifically, embodiments of the present invention relate to improved methods and systems for intra-net traffic routing.

2. Description of the Related Art

Because of the increasing cost and complexity of large operational internet protocol (IP) networks, traffic engineering has become important in recent years. Good traffic engineering can significantly improve the management and performance of operational IP networks while reducing costs. Prior art traffic engineering was based on a solid understanding of traffic flows when designing and configuring traffic routing protocols.

It has been widely accepted in the traffic engineering community that a good understanding of the traffic matrix (TM) and the dynamics of traffic flows can lead to better utilization of link capacities through better traffic routing. Theoretically, if the TM is exactly known, then an optimal traffic routing can be obtained by solving the corresponding multi-commodity flow problem instance, reference D. Mitra and K. G. Ramakrishna, "A Case Study of Multiservice, Multipriority Traffic Engineering Design for Data Networks," Proceedings of IEEE GLOBECOM, pages 1077-1083, IEEE 1999. Based on the TM it is possible to establish link weights, that being the percentage of traffic routed through a particular link in a network of link and nodes between an origin-destination pair, that can be tuned to yield near-optimal utilization.

Unfortunately, measuring and predicting traffic demands are illusive problems. Flow measurements are rarely available on all links and Egress/Ingress points of the network. It is even harder to obtain a good picture of Origin-Destination (OD) flow aggregates. Moreover, traffic demands change over time, both in the short term and in the long term, and are subject to special events or failures, either internal or external to the network. Despite recently developed models and measurement tools that enable extrapolation and estimation of traffic demands, it appeared that the best to hope for was an approximate picture of demand, and not necessarily a very good or very current one.

Even if current traffic demands are known, their dynamic nature poses a challenge: while it is desirable to modify the routing to be highly efficient for the current traffic demands, modifying the traffic routing can potentially cause disruptions in service due to path changes and convergence times while the system reaches a consistent state.

This basic premise, however, never seems to have been quantified: just how important is accurate knowledge of traffic demands to obtaining good network utilization? Since traffic demands are dynamic and illusive, an optimal routing solution at one time could be a poor routing solution at another, and adjusting the routing presents multiple issues.

That poses a question: is it possible, possibly better, to obtain a robust routing that guarantees a nearly optimal utilization based on only a fairly limited knowledge of the applicable traffic demands?

Good traffic engineering would seem to call for a design that is robust under a wide range of conditions. That is, a routing that can perform nearly optimally for a wide range of traffic demands. Thus methods of and systems for routing traffic in a nearly optimal way over a wide range of traffic demands and that handles link failures well would be highly useful.

SUMMARY OF THE INVENTION

Embodiments of the present invention provide highly efficient traffic routing for a wide range of possible traffic matrices (TM) in an intra-domain network. That routing optimally balances the traffic loads over a range of TMs so as to minimize the deviation for any particular TM from the optimal routing. Such a routing provides a guaranteed performance ratio against the best possible network routing.

Embodiments of the present invention utilize a method of optimally configuring a traffic network based on solving a linear program to obtain the optimal routing, and then configuring the routing on the network accordingly.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Prior to the present invention it was not known how to design an intra-net IP traffic routing that optimally balanced a wide range of possible traffic demands so that a good, nearly optimal, traffic routing was obtained under a wide range of traffic demands. The principles of the present invention provide for methods of configuring a network to provide a traffic routing that balances a wide range of possible intra-net IP traffic demands so that a good, nearly optimal, traffic routing is obtained under a wide range of traffic demands.

Embodiments of the present invention can have a low sensitivity of routing quality to traffic demands. This insensitivity has previously not been well understood or precisely quantized: The principles of the present invention address the issue of just how well an intra-net IP traffic routing that is designed with either no knowledge, or with only a limited knowledge, can perform. Systems that are in accord with the present invention can have guaranteed performance over widely varying traffic demand. Embodiments of the present invention are capable of efficient handling of link failures without network re-configuring.

Figure illustrates a typical intra-net system 100 that is comprised of nodes, labeled N1-N2, and links, L1-L34, that interconnect the nodes. The nodes represent communication points, be they individual computers or servers, while the links represent the communication paths to and from the individual links. The links can be wire, cable, optical fiber, microwave, or other techniques of communicating information.

Figure 1:
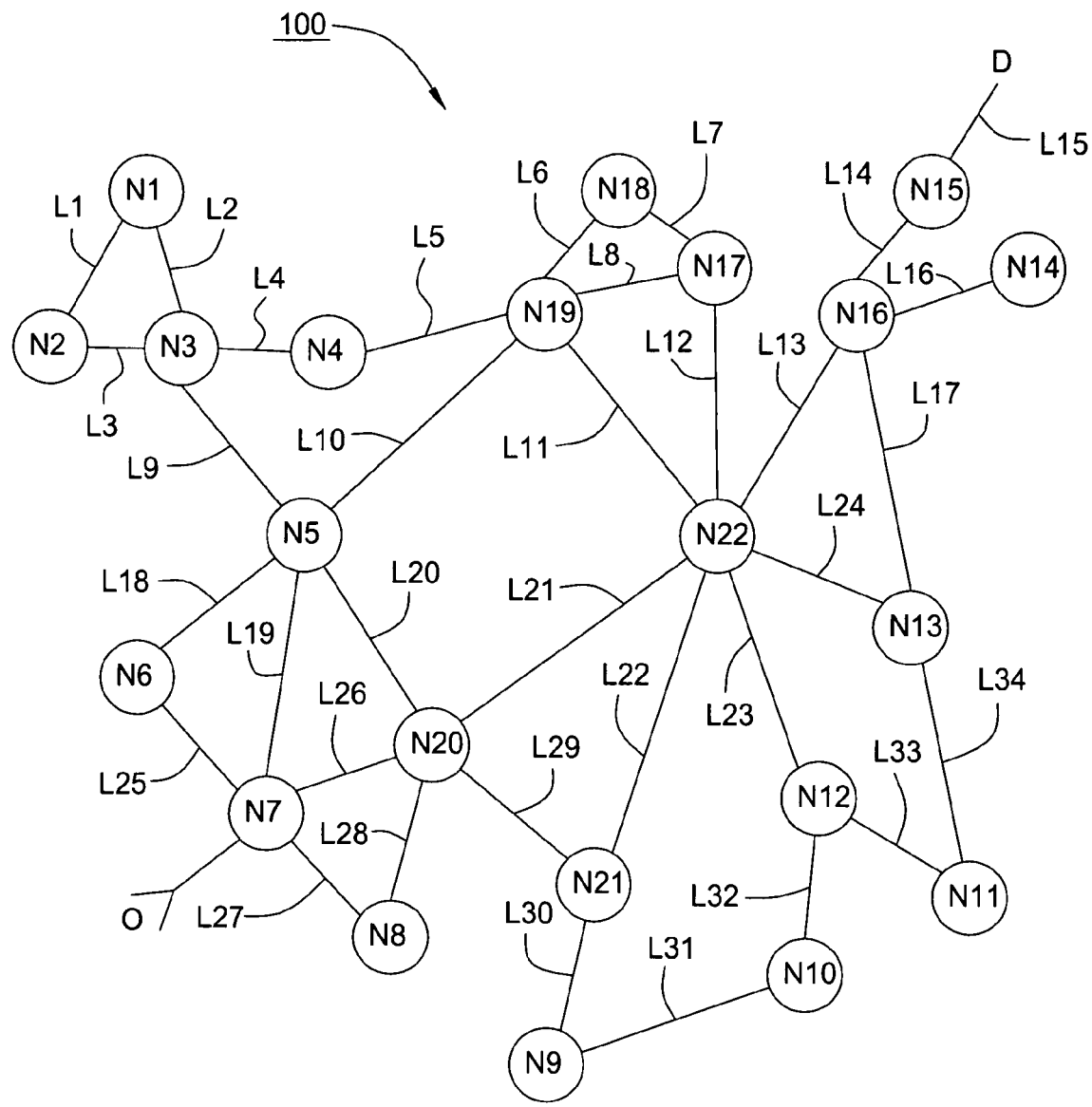
FIG. 1 illustrates an intra-net system showing both nodes and links.
Figure 2:
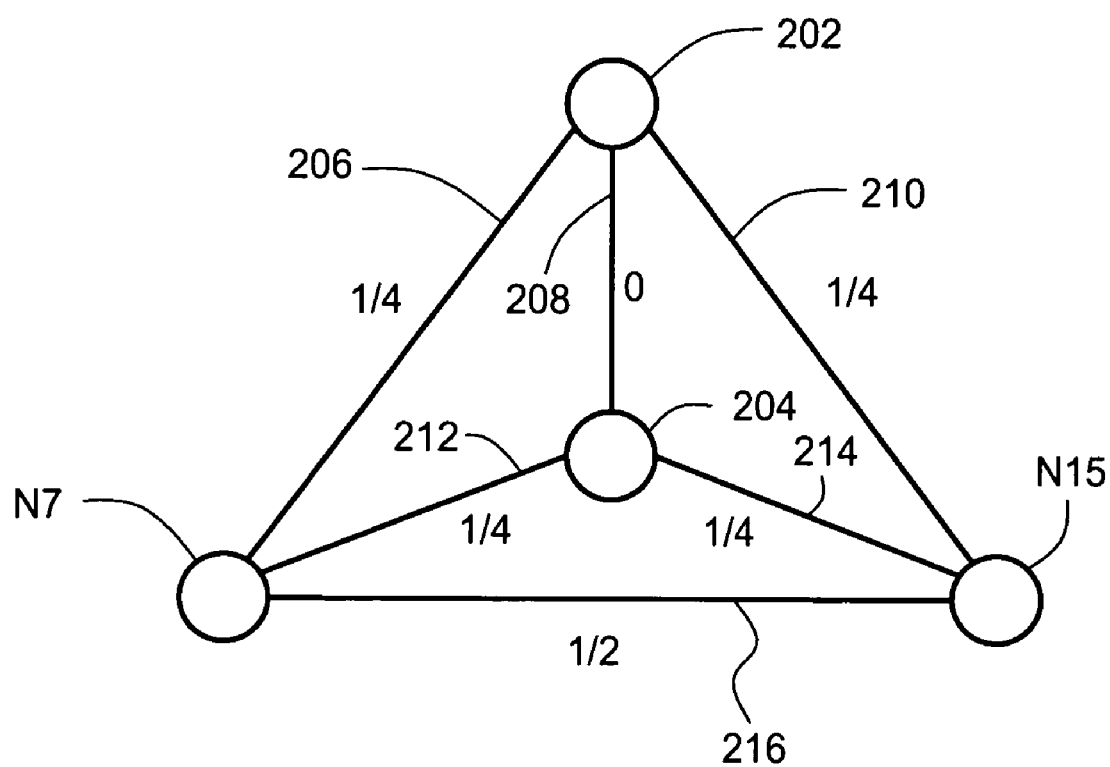
FIG. 2 illustrates a routing scheme for an origin to a destination.

In what follows, a routing specifies how traffic between each Origin-Destination (OD) pair is routed through the links across a network. In FIG. 1, node N7 is designated as the origin while node N15 is designated as the destination. Thus, node N7, say a communication net in Chicago, wants to send traffic to node N15, say a communication net in Los Angeles. Typically there is path diversity, that is, there are multiple paths for each OD pair, and each path routes a fraction of the traffic. This is illustrated in FIG. 2. Assuming the origin N7 wants to send information to node N15, and assuming just two additional nodes 202 and 204 exist, then traffic can be routed numerous ways along the 206-216. However, FIG. 2 shows ½ the traffic flowing through link 216, ¼ flowing through link 206, and ¼ flowing through link 212. Furthermore, FIG. 2 shows that the ¼ flowing through link 206 also flows through link 210 and the ¼ flowing through link 212 flows through link 214. Finally, none of the traffic from node N7 to node N 15 flows through link 208. Various other paths exist (for example, link 206 to link 208 to link 214) and other link weights (traffic percentages) can be assigned to the various paths.

The Open Shortest Path First (OSPF) and Intermediate System-Intermediate System (IS-IS) are protocols that specify a routing through a set of link weights. The traffic between each OD pair is always routed on shortest path(s) between the origin and destination (with respect to these weights). Typically, there are multiple shortest paths. When this happens, each router splits the outgoing traffic evenly on all applicable interfaces. By controlling the link weights, many routings are possible.

One previously recommended link weight default setting is to use link weights that are inversely proportional to the link capacities. With more fine-tuned traffic engineering it is typically possible to select link weights that are expected to work well on the projected TM. The OSPF routing is the routing obtained by the estimated link weights in accord with available data. The OSPF routing should match reasonably closely the actual routing used by many ISPs. The MPLS protocol allows for a rich specification of routings and more fine tuned traffic engineering.

The principles of the present invention provide for a method of operating a traffic network using an optimal routing for variable or uncertain traffic demands. Those principles further provide for a network that routes traffic in accord with constraints on OD pair demands.

The method uses a modeled variability or uncertainty for each Origin-Destination (OD) pair to specifying a range of possible demands. The method determines the "best possible" routing for any traffic demand within the specified ranges (that is, for each Origin-Destination pair, the demand is within the range specified for that pair). The notion of "best" is based on a competitive ratio. A routing's competitive ratio is the maximum over all traffic demands of the routing's congestion to the minimum possible congestion. An optimum routing is the one which has the smallest competitive ratio. The method determines the best possible routing by resolving a linear program that minimizes the competitive ratio subject to multiple constraints. The method simultaneously determines the optimal routing and certifies that the competitive ratio is satisfied.

The relevant characterization of each routing is what fraction of the traffic for each OD pair is routed along each link. Thus, the traffic routing is specified by a set of values $f_{ab}(i,j)$ that determine the fraction of traffic demand from a to b that is routed on a link (i,j). Note that the values $f_{ab}(i,j)$ for a given OD pair a→b specify a flow of value 1 from a to b. When the routing routes a demand $d_{ab}$ for the OD pair a→b the contribution of this demand to the flow on a link (i,j). is $d_{ab} f_{ab}(i,j)$.

A common metric for the performance of a given routing with respect to a certain TM is the maximum link utilization. This is the maximum, over all links, of the total flow on a link divided by the capacity of the link. Formally, the maximum link utilization of a routing f on TM D (where $d_{ab}$ is the demand from a to b) is:

$$\operatorname*{Max}_{(i,j) \in links} \sum_{a,b} d_{ab} f_{ab}(i,j) \div cap_{ij}$$

where $cap_{ij}$ is the capacity of the link (i,j).

An optimal routing for a certain TM D is a routing which minimizes the maximum link utilization. Formally, the optimal utilization for a TM D is given by $$OPTU(D) = \min_{f \mid f \text{ is a routing}} \max_{(i,j) \in links} \frac{\sum_{a,b} d_{ab} f_{ab}(i,j)}{cap_{ij}}$$

The performance ratio of a given routing f on a given TM D measures how far f is from being optimal on the TM D. It is defined as the maximum link utilization of f on D divided by the minimum possible maximum link utilization on this TM. Formally, $$PERF(f, \{D\}) = \frac{\max_{(i,j) \in links} \sum_{a,b} d_{ab} f_{ab}(i,j)/cap_{ij}}{OPTU(D)}$$

The performance ratio is always at least 1; it is exactly 1 if and only if the routing is optimal for D.

It is well known that the optimal routing for a given TM can be computed by solving a corresponding multi-commodity flow linear program. Note that this routing is optimized for a specific TM, thus, it does not provide performance guarantees for other TMs. This is important, since, as mentioned earlier, traffic patterns change over time and it is also not generally possible to obtain a good estimate of the current TM.

The definition of the performance ratio follows the competitive analysis framework where performance guarantees of a certain solution are provided relative to the best possible solution. The definition of performance ratio of a routing can be extended to be with respect to a set of TMs. Let D be a set of TMs. The performance ratio of a routing f on D is defined as $$PERF(f, \{D\}) = \max_{D \in D} PERF(f, \{D\}).$$

A routing f is optimal for D if and only if it minimizes the performance ratio, that is PERF(f,D) is minimal. The performance ratio PERF(f,D) is always at least 1, but the best possible performance ratio on the set of TMs D can be strictly larger than 1; since generally, a single routing that is optimal for all TMs in the set may not exist.

When the set D includes all possible TMs, the performance ratio is referred to as the oblivious performance ratio of a routing. The oblivious ratio is the worst performance ratio a routing can obtain with respect to any TM. A routing with a minimum oblivious ratio is an optimal oblivious routing, and its oblivious ratio is the optimal oblivious ratio of the network.

Note that the performance ratio constitutes a comparative measure of different routings, for a given topology and set of TMs. It is not, however, a meaningful comparative measure between different network topologies, it is defined relative to the minimum possible maximum link utilization, but the min max utilization itself varies with topology. Also there can be many possible optimal routings and they can differ in how they perform on specific TMs.

Known tools allowed for optimizing the routing with respect to a given TM, but beyond specific highly structured topologies (such as hypercubic networks), not much was known about constructing an optimal routing with respect to a rich set of demands and what performance ratios could be expected. Existentially, an upper bound exists: all symmetric networks (that is, networks where link capacities are the same in both directions, as is typically the case with large backbone networks) have a routing with an oblivious ratio that is at most polylogarithmic in the number of nodes. Further, an optimal oblivious routing can be computed in polynomial time. The polynomial time algorithm is based on the Ellipsoid algorithm and as such does not provide a practical way to produce the routing for large networks.

However, the principles of the present invention provide for enhanced LP (linear program) models (see details subsequently) that are comprised of a single polynomial size LP formulation. Those models can be extended to optimize routings with respect to range restrictions on OD-pair demands. (a restricted set of TMs will provide a better ratio). The inventors have simulated and solved the LP models using the CPLEX LP solver, a large-scale mathematical programming software (2003 version), see http://www.cplex.com. However, other LP solvers could be applied equally as well).

Figure 3:
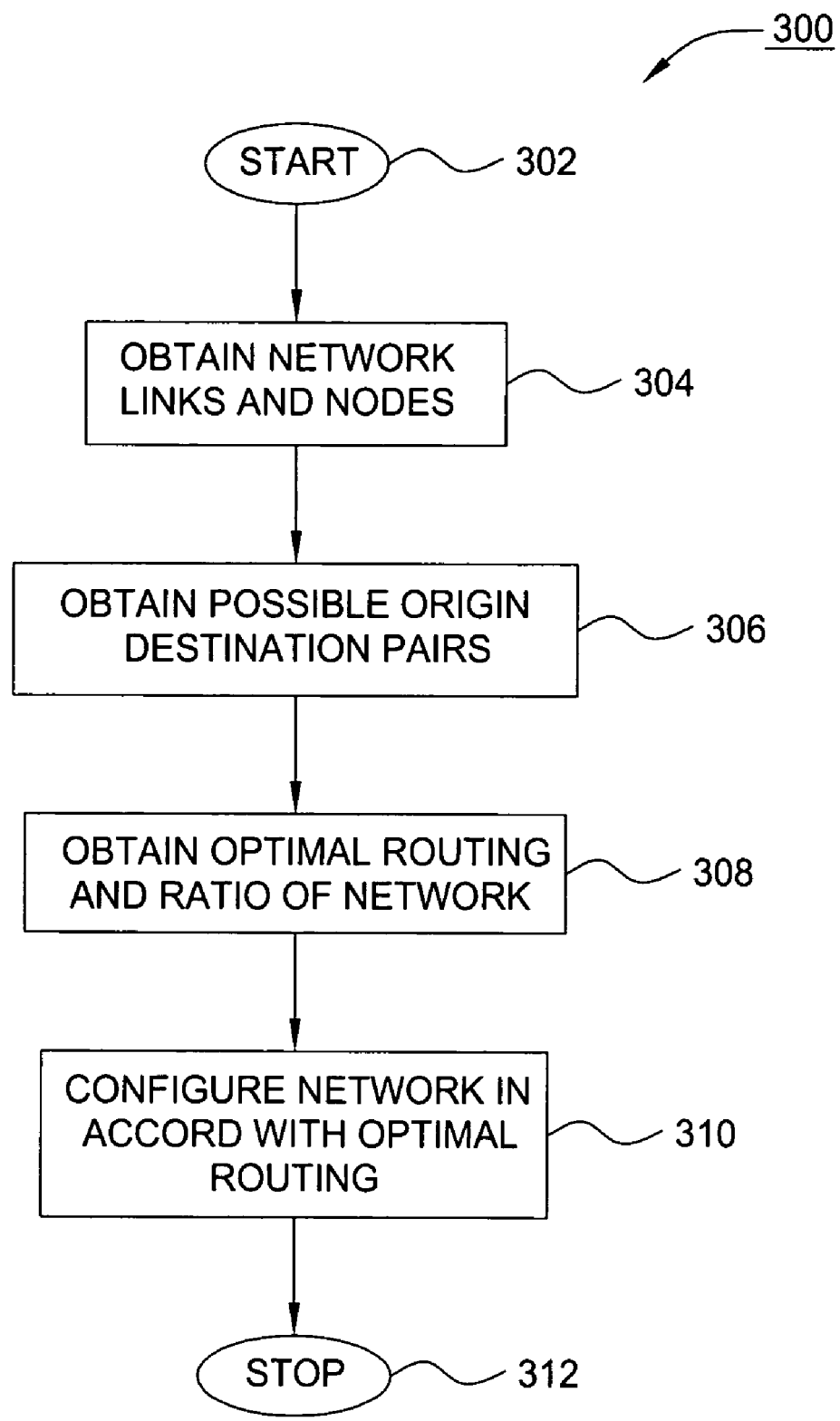
FIG. 3 illustrates a flow diagram of a method of configuring the intra-net system shown in FIG. 1.

FIG. 3 is a flow chart of a method 300 of setting up and operating an intra-net that is in accord with the present invention. That method starts at step 302 and proceeds at step 304 with obtaining basic information about the intra-net, specifically the nodes and the links. Then, at step 306 the method determines the possible origin-destination pairs. Not all nodes need be part of origins or destinations. Then, at step 308, the method proceeds by obtaining the optimal routing and ratio of the network. Then, at step 310, the optimal routing is used to configure the network. Finally, with the network set-up, the method stops at 312.

The LP (linear program) models are based on a set of lemmas that are used to reduce the size of the models. The lemmas lead to a result that establishes that an optimal oblivious routing (and oblivious ratio) of a network can be computed in polynomial time. That result leads to simplified LP models that allow for considerably faster running times.

Basic lemmas show that for the purposes of computing a performance ratio of sections of a network where path diversity is not possible (all routing would perform the same) can be "factored out" of the network topology. This reduces the size of the input topologies.

A first lemma is that removal of degree-one nodes does not affect the oblivious ratio of the network. Similarly, such removal does not affect the optimal performance ratio with respect to any set of TMs.

The first lemma is a corollary of a second lemma: the optimal oblivious ratio of a network can be computed by partitioning the network to 2-edge connected components and taking the maximum of the oblivious ratio over these components.

Proof: If the network G is not 2-edge connected, it can be partitioned into two non-empty components A and B that are connected by an edge (a,b) where a∈A and b∈B. It is easy to see that the optimal oblivious ratio of G is at least that of the maximum optimal oblivious ratio of A and B: The optimal performance ratio obtained on G for TMs that have positive demands only at OD pairs that both lie in A (respectively, both lie in B) is equal to the optimal oblivious ratio of A (respectively, B). To see that, observe that all flow leaving/entering A must go through the edge (a. b), thus there is never an advantage to route demand internal to A through the edge (a, b) and out of A, since this flow will have to traverse back on the same edge and form a flow cycle (the symmetric argument holds for B). The optimal oblivious ratio of G is at least the optimal performance ratio on these more restricted set of TMs.

We now argue the converse, that the optimal oblivious ratio on G is at most the maximum optimal oblivious ratio of A and B. Let $f_A$ (respectively, $f_B$) be an optimal oblivious routing on A (respectively, B). We extend the routings $f_A$ and $f_B$ to a routing $f_G$ on G as follows: all OD pairs internal to A or B are routed according to the respective routing. The routing for OD pair (a', b') where a"A and b" B (similar construction for pairs (b', a')) is routed by concatenating the routing $f_A$ from a' to a with a flow of value 1 from a to b with the routing $f_B$ from b to b'. Consider now a TM $D_G$ on G. We will show that the performance ratio of $f_G$ on G is at most the maximum optimal oblivious ratio of A and B. We can assume (by scaling $D_G$) that the maximum edge utilization of the optimal routing of $D_G$ is 1. Thus, the performance ratio of $f_G$ on $D_G$ is equal to the maximum edge utilization. We now define the TMs $D_A$ and $D_B$ for A and B, respectively; where $D_A$ is obtained by aggregating all the demand into/from nodes in A from/into nodes in B to demands from/into the node a ($D_B$ is similarly defined).

The maximum edge utilization of $f_G$ on $D_G$ is the maximum utilization over the edges of A, the edges of B, and the edge (a, b). The utilization of the edge (a, b) is equal to the aggregated demand between A and B. Since the utilization must be at least that also for the optimal routing for $D_G$, from our scaling assumption It follows that the aggregated demand is at most the capacity of (a, b), and thus the utilization is at most 1. The maximum edge utilization over the edges of A is equal to the utilization of $f_A$ on the demands $D_A$, which is at most the optimal oblivious ratio of A (similar for B.) The symmetric argument for the edges of B concludes the proof.

A network with symmetric directed links (that is, link capacities are equal in both directions) always has an optimal oblivious routing that is symmetric. Since links are often symmetric, we use this to reduce the size of our LP models.

Based on the foregoing a linear program model can be developed. It has been shown that an optimal oblivious routing can be computed by solving a Linear Program (LP) with a polynomial number of variables, but infinitely many constraints (every possible TM has a set of constraints). We refer to this LP as the "master LP." We use the following notation: the term "link" for an undirected edge, "edge" for a directed edge, and let link-of (e) be the link corresponding to edge e. We use the notation:

$$f_{ij}(l) = \sum_{e\text{-link-of}(e)=l} f_{ij}(e).$$

The master LP model is:

$$\min r \quad (1)$$

$f_{ij}(e)$ is a routing $\forall$ links $l$ $\forall$ TMs $D$ with $OPTU(D) = 1$:

$$\sum_{ij} f_{ij}(l)d_{ij} \le r$$

Furthermore, given a routing $f_{ij}(e)$, the constraints (1) can be tested by solving, for each link l, the following "slave LP," and testing if the objective is $\le r$ or not.

$$\max \sum_{ij} f_{ij}(l)d_{ij}/cap(l) \quad (2)$$

$g_{ij}(e)$ is a flow of demands $d_{ij}$ $\forall$ links m: $\sum_{ij} g_{ij}(m) \le cap(m)$ $\forall$ demands $i \to j: d_{ij} \ge 0$ Thus, the LPs (2) can be used as a separation oracle for the constraints (1), giving polynomial solvability using the Ellipsoid algorithm.

A simpler LP model that enables us to efficiently process larger networks can be derived. For simplicity, our discussion focuses on computing the optimal oblivious routing, that is, a routing that provides performance guarantees with respect to all possible TMs. We then state the generalized LP model we used to support interval restrictions on OD pairs demands.

The first simplification one might try to apply is to somehow directly combine the master and slave LPs, to yield a single polynomial size LP instance. However, there are two obstacles: first, both $f_{ij}(l)$ and $d_{ij}$ would be variables in a combination, resulting in quadratic (non linear) constraints, and second, requiring that a maximum over an LP be $\ge r$ is not readily modeled. Fortunately, the LP dual of the systems (2) leads to a nice characterization of good oblivious routings:

Theorem 1: A routing $f_{ij}(e)$ has oblivious ratio $\ge r$ if and only if there exist weights $\pi(l, m)$ for every pair of links l, m such that:

P1 $\Sigma_m cap(m)\pi(l,m) \le r$ for every link l.

P2. For every link l, for every demand $i \to j$, and for every path $h_1, h_2, \ldots, h_p$, from i to j, $$f_{ij}(l) \le cap(l)\sum_{k=1}^{p} \pi(l, \text{link-of}(h_k)).$$

P3 $\pi(l,m) \ge 0$ for all links l,m

Proof: The proof is essentially duality applied to the slave problem. Requirements (P1)-(P3) are equivalent to stating that the slave LP's have dual objective values $\ge r$.

("if" direction): Let $f_{ij}(e)$ be a routing, and $\pi(l,m)$ be weights satisfying requirements (P1)-(P3). Suppose (g,d) is a flow of demands d with maximum utilization of 1, and let l be a link. For each demand $i \to j$, $g_{ij}$ must contain paths from $i \to j$ of total weight $d_{ij}$. From (P2) and (P3), summing over all paths, we have $$f_{ij}(l)d_{ij} \ge cap\left(l\sum_h \pi(l, \text{ling-of}(h))g_{ij}(h)\right)$$

Summing over all demands $i \to j$, we have $$\sum_{ij} f_{ij}(l)d_{ij} \le cap(l)\sum_{ij}\sum_h \pi(l, \text{link-of}(h))g_{ij}(h) =$$

$$cap(l)\sum_m \left(\pi(l,m)\sum_{ij} g_{ij}(m)\right) \le cap(l)\sum_m (\pi(l,m)cap(m))$$

The last inequality follows since g fits within the edge capacities $$\left(\sum_{ij} g_{ij}(m) \le cap(m)cap(m)\right), \text{ and from } (P1)$$

$$\sum_{ij} f_{ij}(l)d_{ij} \le cap(l)\sum_m \pi(l,m)cap(m) \le cap(l)r \cdot_{ij}$$

This says that for any demand d which can be routed with congestion 1, fs utilization on any link l is at most r, which is what we wanted.

("only if" direction): Let flow $f_{ij}(e)$ have oblivious ratio $\le r$, and let l be a link. The dual of the slave LP (2) for link l is:

$$\min \sum_m cap(m)\pi(l,m) \quad (3)$$

$\forall$ demands $i \to j$: $\lambda_{ij}(l,j) \ge \int_{ij}(l)/cap(l)$ $\forall$ demands $i \to j$, $\forall$ edges $e = i' \to j'$:

$$\pi(l,\text{link-of}(e)) + \lambda_{ij}(l,i') - \lambda_{ij}(l,j') \ge 0 \quad (4)$$

$\forall$ links m: $\pi(l,m) \ge 0$ $\forall$ demands $i \to j$, $\forall$ nodes k: $\lambda_{ij}(l,k) \ge 0$ $\forall$ demands $i \to j$: $\lambda_{ij}(l,i) = 0$ The variable $\lambda_{ij}(l,k)$ is the dual multiplier on the flow conservation constraint for demand $i \to j$ at node k. Since there is no flow conservation constraint in the primal at node i, we have introduced $\lambda_{ij}(l,i)$, fixed at 0, for convenience. The variable $\pi(l, m)$ is the dual multiplier on the capacity constraint for link m.

Since $f_{ij}(e)$ has oblivious ratio $\leq r$, the primal slave LP for any link l must have optimum $\leq r$, and hence also the dual slave LP for link l must have optimum $\leq r$. Hence, the $\pi\pi(l,m)$ from the dual slave LPs satisfy (P1). Trivially, they also satisfy (P3). Now, let i→j be a demand, and $h_1, \ldots, h_p$ be a path from l to j. Summing up constraint (4) over edges $h_1, \ldots, h_p$ we have $$\sum_{k=1}^{p} \pi(l, \text{linki-off}(h_k)) + \lambda_{ij}(l, i) - \lambda_{ij}(l, j) \leq 0$$

Since $\lambda_{ij}(l,i)=0$ $$\sum_{k=1}^{p} \pi(l, \text{link}-\text{off}(h_k)) \leq \lambda_{ij}(lji) \leq f_{ij}(l)/\text{cap}(l)$$

so the $\pi(l, m)$ satisfy (P2).

We next apply Theorem 1 to show that the problem can be solved by a single polynomial-sized LP. This results in a significant algorithmic performance gain, since it means the problem can be solved by the more efficient interior-Point algorithm.

Theorem 2: The oblivious ratio of a network can be computed by a single LP with $O(mn^2)$ variables and $O(nm^2)$ constraints.

Proof. We introduce the variables $p_l(i, j)$, for each link l and OD pair i, j. The variable $p_l(i, j)$ is the length of the shortest path from i to j according to the link weights $\pi(l, m)$ (for all m). The introduction of these variables allows us to replace the exponential number of constraints (for all possible paths) in Requirement (P2) of Theorem 1 with a small polynomial number of constraints.

mm r $f_{ij}(e)$ is a routing $$\forall \text{ links } l: \sum_{m} \text{cap}(m)\pi(l, m) < r$$

$\forall$ links l, $\forall$ pairs i→j:

$f_{ij}(l)/\text{cap}(l)-s_l^+(l,j)+s_l^-(l,j)=p_l(l,j)$ $\forall$ links l, $\forall$ nodes l, $\forall$ edges e=j→k:

$\pi(l,\text{link-of}(e))+p_l(i,j)-p_l(i,k) \leq 0$ $\forall$ links l,m: $\pi(l,m) \leq 0$ $\forall$ links l, $\forall$ nodes i: $p_l(i,i)=0$ $\forall$ links l, $\forall$ nodes i,j $\_\leq 0$ This LP has $O(mn^2)$constraints.

To compute the oblivious ration when demand i j I is restricted to the range $[a_{ij}, b_{ij}]$, we modify the slave LP (2) by replacing the constraint $d_{ij} \leq b_{ij}$, and following that change through the dual LP (3) into the single LP (5). This results in the introduction of the slack variables $s_l^-(i,j)$ and $s_l^+(i,j,)$ for the lower and upper bound constraints on $d_{ij}$.

mim r $f_{ij}(e)$ is a routing $$\forall \text{ links } l: \sum_{m} \text{cap}(m)\pi(l, m) < r$$

$\forall$ links l, $\forall$ pairs i→j:

$f_{ij}(l)/\text{cap}(l)-s_l^+(l,j)+s_l^-(l,j)=p_l(l,j)$ $\forall$ links l, $\forall$ nodes l, $\forall$ edges e=j→k:

$\pi(l,\text{link-of}(e))+p_l(i,j)-p_l(i,k) \leq 0$ $\forall$ links l,m: $\pi(l, m) \leq 0$ $\forall$ links l, $\forall$ nodes i: $p_l(i,i)=0$ $\forall$ links l $$\sum_{ij}(b_{ij}s_l^-(i, j)) \leq 0$$

$\forall$ links l, m: $\pi(l,m) \geq 0$ $\forall$ links l, $\forall$ nodes i: $p_l(i, i)=0$ $\forall$ links l, $\forall$ nodes i,j: $p_l(i, j) \geq 0$ $\forall$ links l, $\forall$ nodes i,j: $s_l^-(i,j) \geq 0$ $\forall$ links l, $\forall$ nodes i,j: $s_l^+(i,j) \geq 0$ This reduces to the single LP if the bounds are [0∞).

We analyze the optimal oblivious ratio for two simple families of network topologies: The cycle topology $C_n$, has n nodes that are connected in a cycle pattern with unit capacity links. The clique topology Kn has n nodes connected via a complete graph, that is, there is a unit capacity edge connecting any two nodes.

Our interest in these networks is two-fold. First, these networks admit an optimal oblivious ratio bounded by 2 (even for large values of n). This provides some indication that a small "constant" optimal oblivious ratio is possible as ISP networks scale up. Second, these simple topologies better illustrate our metrics and the notion of a good "demand oblivious" routing.

These two families of topologies are highly homomorphic ("look the same" from any node). We will find the following lemma useful for analyzing them:

Lemma 7.1: If two nodes u and v are homomorphic under some homomorphism H, then there exists an optimal oblivious routing such that the routing from u to a node w on an edge e is equal to the routing from v=H(u) to H(w) on the edge H(e).

Figure 4:
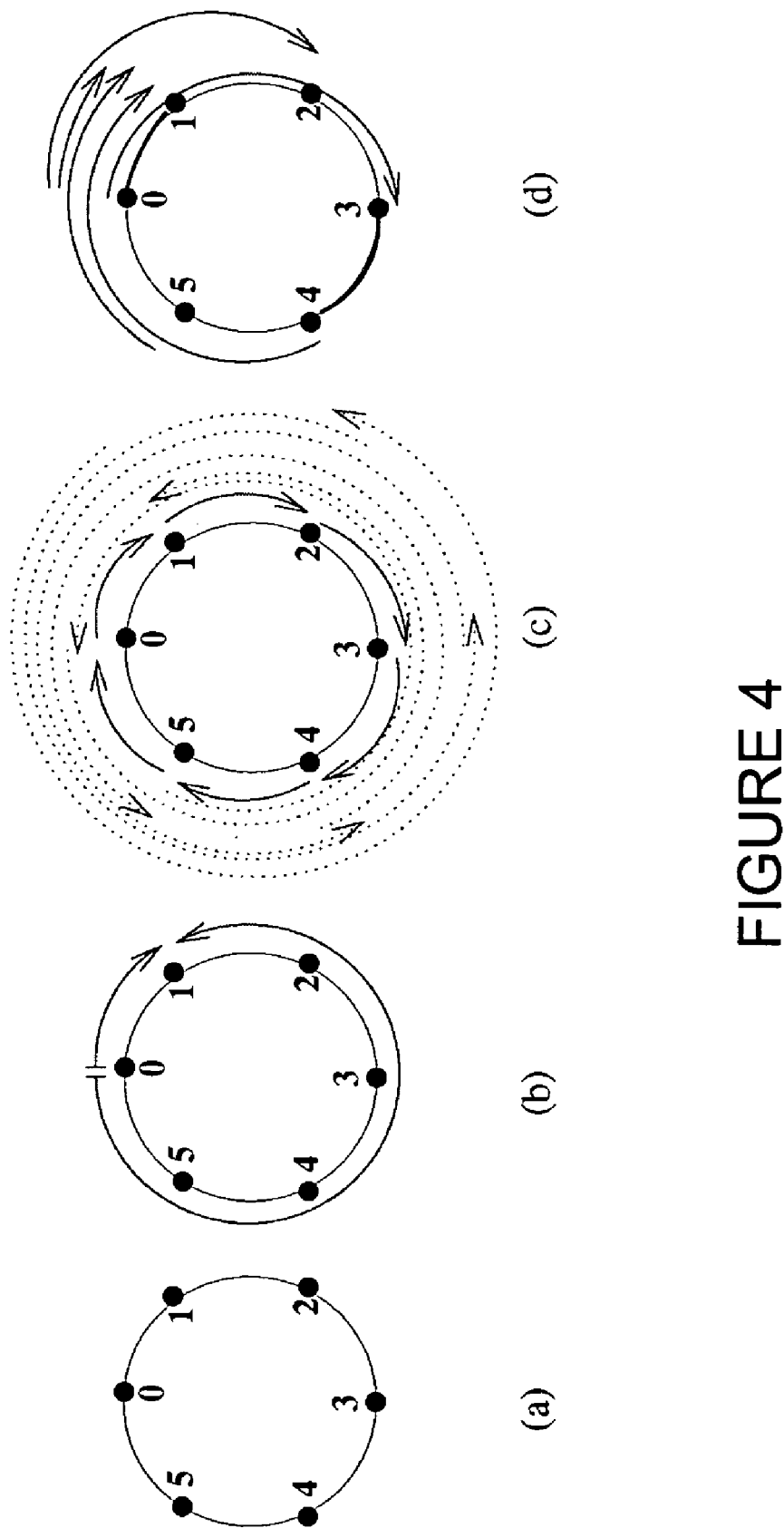
FIG. 4 illustrates a $C_6$ network topology.

FIG. 4 (a) illustrates the $C_6$ topology. Consider first a TM that constitutes of a positive demand on the single OD pair 0→1. The optimal routing for this TM (that is, the routing that minimizes the maximum utilization) balances the load on the two disjoint paths form 0 to 1: half the demand flows on the direct edge (0, 1) and the other half on the 5-edge path (0,5,4,3,2,1) (this "even-split" routing is illustrated in FIG. 4 (b). The shortest-path routing, which sends the flow of each OD pair on the shorter of the two available paths (that is, for our TM it would send all flow on the direct edge (0, 1)), has performance ratio of 2 on our TM, as the maximum link utilization obtained by this routing is double that of the even-split routing.

We next consider another simple TM where there are unit demands on all "consecutive" OD pairs i→(i+1) mod 6 (for i=0, . . . 5), and no demand on other pairs. We first consider routing the demand of each OD pair evenly on the two available paths (using the "even-split" routing we used in part (b)). The flow routes of the routings on this TM are illustrated in FIG. 4 (c): The solid lines indicate the routes used by the shortest-path routing. The solid and dotted paths together are used by the even-split routing, which induces a flow of half from every OD pair demand on every edge. We thus obtain that the even-split routing has link utilization of 3. In contrast, the shortest-path routing (solid lines in (c)) would send on each edge only the demand due to the very same OD pair, resulting in maximum link utilization of 1. Thus, the performance ratio of the even-split routing on this TM is at least 3 (in fact, it is exactly 3 since the direct routing is optimal). The same argumentation can be carried over to other cycle topologies $C_n$ it is not hard to see that the even-split routing would have utilization of m/2 and performance ratio of n/2 (since the shortest-path routing has maximum utilization of 1).

What this means is that the even-split routing is a bad oblivious routing. The next issue is finding a good oblivious routing. We consider general TMs and argue that the shortest-path routing has oblivious ratio of 2. The shortest-path routing for all OD pairs that utilize the edge (0, 1) is illustrated in FIG. 4 (d). Consider an arbitrary TM, and the edge with highest utilization according to the shortest-path routing. Without loss of generality we can assume that this edge is (0, 1). We refer to the edge (3, 4) as the "opposite edge" from (0, 1). (In general for even valued n, the opposite edge of (i,(+1)modn) on $C_n$, is the edge (i+n/2, (i+1+n/2) mod n).) It is not hard to verify the following property: for every OD pair that its demand is routed by the shortest-path routing on the edge (0, 1), the two edges (0, 1) and its opposite edge (3, 4) "disconnect" the pair (the two edges are "cut" edges). What this means is that for any routing, the sum of flows that are due to demand 0→1 on the edge (0, 1) and its opposite edge must be at least the demand between 0 and 1. It follows that for any routing, the maximum utilization over the two edges (0, 1) and its opposite must be at least half of the utilization of (0, 1) under shortest-path routing. We thus obtain that the performance ratio of the shortest-path routing is at most 2.

We next provide a formal proof that states that the best possible performance ratio for the cycle $C_n$ is 2−2/n. We shall see that the optimal oblivious routing will send some flow along the longer path (but most flow along the shorter path). We use the following notation: we number the nodes of $C_n$, as 0, . . . , n−1, with node numbers taken modulo n, so that the edges are (i,i+1) and (i+1, i) $f_{a,b}$(i, j)) is the oblivious routing's flow for demand a a→b on edge i→j.

Lemma 7.2: The optimal oblivious performance ratio for $C_n$, (the cycle on n vertices) is 2−2/n.

Proof: We first show that the ratio is at least 2−2/n: From symmetry (see Lemma 7.1) and flow conservation considerations, there is an optimal oblivious routing of the following form: for some $x_i \geq 0$ $f_{a,a+k}(a+i,a+i+1)=x_k$ ∀a,k∈[1,n−1], ∀i∈[0,k−1]

$f_{a,s+k}(a-i,a-i-1)+1x_k$

∀a,k∈[1,n−1]

$f_{a,b}(c,d)=0$ for all other a,b,c,d $x_k=1-x_{n-k}$

∀k∈[1,n−1]

For any a, a demand a→(a+1) of size 2 can be routed within unit capacities, so from the load on edge (a, a+1), we have that the optimal ratio is at least $2*f_{a,a+i}(a,a+1)=2x_i$ On the other hand, a demand for all a→a+1(a=0 . . . n−1) of size 1 can also be routed within unit capacities, so from the load on a particular edge: (a,a +1), we have that the ratio is at least $\sim \Sigma f_{a\_i,a+i1}(a,a+1)=x_1+(n-1)(1-x_1)i=0 \ldots n-1$ From the above two bounds we obtain that the optimal ratio is at least $\max\{2x_1, x_1+(n-1)(1-x_1)\} \geq \_2-2/n$ (the maximum is minimized when $x_1$=(n−1/n)).

It remains to show that the optimal ratio is at most 2−2/n. Consider the routing obtained by setting $x_k$=(n−k)/n, we show that this routing has oblivious performance ratio of at most 2−2/n. Consider, without loss of generality, the edge (0, n−1). A demand $d_{a,b}$, with 0≤a ≤b≤n−1, must either be routed using the edge (0, n−1), or be routed on the path (a, a +1, . . . , b), using b−a edges. Similarly, a demand $d_{b,a}$ with 0≤a≤b≤n−1 must either be routed using the edge (n−1, 0) or be routed on the path (b, b−1, . . . , a) using b−a edges. Consider now a TM that can be routed such that each edge has at most 1 unit of flow on it. It suffices to show that our routing has utilization at most 1-2/n on that TM. Consider such demands and supposed that the optimal routing for that TM is such that none of the demands were routed on the edge (0, n−1). Then the total edge load generated on the edges (0, 1, . . . , n−1) would be:

$$\sum_{0 \leq a < b \leq n-1} (b-a)(d_{b,a}) \Bigr].$$

However, at most a total flow of 1 can be routed using the edge (n−1, 0), so the combined flow on the other n−1 edges must be at least $$\left( \sum_{0 \leq a < b \leq n-1} (b-a)(d_{a,b}+d_{b,a}) \right) - (n-1).$$

The total flow on those n−1 edges must be less than their total capacity, so we obtain that $$\left( \sum_{0 \leq a < b \leq n-1} (b-a)(d_{a,b}+d_{b,a}) \right) - (n-1) \leq n-1.$$

The utilization on edge $(0,n-1)$ of our oblivious routing for these demands is $$\sum_{0 \le a < b \le n-1} (1 - x_{b-a})(d_{a,b} + d_{b,a}) =$$

$$\sum_{0 \le a < b \le n-1} (b-a)/n(d_{a,b} + d_{b,a}) \le 2(n-1)/n = 2 - 2/n.$$

For the clique topology, the shortest-path routing, where the flow of each demand is routed on the direct edge, performs very poorly, with performance ratio of n−1. We shall see that the optimal oblivious routing for the clique topology utilizes 2-hop paths.

Lemma 7.3: The optimum oblivious ratio for K, the complete graph on n vertices) is 2−2/n.

Proof: We first show that the ratio is at least 2−2/n: From symmetry and flow conservation, we know that there is an optimal oblivious routing with the following form: for some $\chi \ge 0$ $$f_{a,b}(a,b) = \chi$$

for all distinct a,b $$f_{a,b}(a,c) =$$

$$f_{a,b}(c,b) = (1-\chi)/(n-2)$$

for all distinct a,b,c $$f_{a,b}(c,d) = 0$$

for all other a,b,c,d

The minimum s-t cut between any two nodes is n−1. Thus, for any given OD pair a, b, a demand a→b of size (n−1) can be routed such that the maximum flow on any edge is 1. By considering such single OD pair demands a →b, and the edge (a, b), we obtain that the optimal ratio is at least $$(n-1)*f_{a,b}(a,b) = (n-1)*\chi$$

We now consider a TM such that there is a demand of 1 for each OD pair c→d (c<d). Such TM can also be routed within unit capacities by routing each demand c→d on the "direct" edge (c, d). By considering the flow of our routing on the edge a→b, we have that the optimal ratio is at least $$1 * f_{a,b}(a,b) + \sum_{c \notin \{a,b\}} F_{a,b}(a,b) + \sum_{c \notin \{a,b\}} f_{c,b}(a,b) =$$

$$\chi + 2*(n-2)*(n-2)*(1-\chi)/n-2.$$

from the above two constraints we obtain that the optimal ratio is at least $\max\{x*(n-1), 2-x\} \ge 2-2/n$ (the maximum is minimized when x=2/n).

It remains to show that the optimal ratio is at most 2−2/n. We will use a routing of the form (6) with x+2/n, and show that its oblivious performance ratio is at most 2−2/n. Consider a particular edge a b. Since a and b have degree n−1, any TM which can be routed with at most one unit of flow on each edge must satisfy $$\sum_{c \ne a} d_{a,c} + d_{c,a} \le n - 1$$

-continued $$\sum_{c \ne b} d_{b,c} + d_{c,b} \le n - 1$$

Therefore, $$2d_{a,b} + 2b_{b,a} + \sum_{c \notin \{a,b\}} (d_{a,c} + d_{c,a} + d_{b,c} + d_{c,b}) \le 2(n-1)$$

From (6), some optimal oblivious routing then satisfies that the flow on the edge (a,b) is equal to $$\sum_{c,d} (d_{c,d} f_{c,d}(a,b) + d_{c,d} f_{c,d}(b,a)) =$$

$$\sum_{c \notin a,b} d_{a,c}(1-\chi)/(n-2) + d_{b,c}(1-\chi)/(n-2) +$$

$$d_{c,a}(1-\chi)/(n-2) + d_{c,b}(1-\chi)/(n-2) \bigg) + d_{a,b}\chi + d_{b,a}\chi$$

By substituting $\chi=2/n$ we obtain that the flow on (a,b) is $$\sum_{c \notin a,b} (d_{a,c} + d_{b,c} + d_{c,a} + d_{c,b})/n + (2d_{a,b} + 2d_{b,a})/n \le 2(n-1)/n = 2 - 2/n$$

What is the best performance ratio guarantee attainable barring any knowledge of traffic demands? Our method provides a computation of an optimal oblivious routing and its performance ratio. The results are that the oblivious performance ratio on evaluated topologies range from 1.425-1.972, which means that these networks have a routing that on any TM is guaranteed to have maximum link utilization that is at most 43%-97% larger than the best possible specific routing for this TM. While a 43%-97% (worst case) overhead in max utilization is far from negligible, the good news is that such guarantees can be obtained with no knowledge whatsoever on the traffic demands. Typically, however, even though an exact current estimate of the TM is very hard to obtain, much about the TM is known. The TM can vary within some known range or can be estimated to within some known accuracy. In this case, we would like a performance guarantee with respect to all TMs that lie within some range. The next question we examine is the sensitivity of the performance ratio to the error margin within which the TM is known.

Another benefit of systems that are in accord with the principles of the present invention is that they perform well under random link failures: The inventors simulated link failures where a random link loses 50% or 80% of its capacity. The optimal routing for the non-failed network, although not optimized for failures, typically obtains reasonable performance under such failures. The explanation is that a good oblivious routing tends to spread over many available paths for each OD pair, a property that increases its resilience to failures.

From the foregoing it should be obvious that traffic demands are illusive. They are hard to estimate and are dynamic in nature. Good system engineering should seek a routing that performs well independently of traffic demands (or for a wide range of demands). We have developed methods and systems for obtaining such a routing and arrive at perhaps unexpected results. First, it is possible to obtain a surprisingly good routings with poor or no knowledge of the traffic demands. On current ISP topologies, we have shown that there exists a routing that guarantees a performance ratio that is less than 2 on any possible traffic matrix. This demand oblivious routing can be obtained without knowledge of the traffic matrix and by taking only the topology (along with link capacities) into account. With a very limited knowledge of the TM we can do much better, often obtaining a routing with performance ratio that is very close to 1 even for error margins of 50%-100% in knowledge of the traffic demands.

Similarly, one can obtain a fixed routing that would perform well on an expected range of demands, thus, reducing the need for routing adjustments when traffic demands shift. Second, it is unlikely that such a robust routing can be obtained via standard previously-existing tools: The design of a routing with optimal or nearly optimal performance guarantees seems to require the algorithmic tools we employed here. We observed that some natural candidates for routings can perform badly on demands they are not specifically designed to handle. Moreover, even a routing designed to be optimal on specific TMs deteriorates quickly with the margins within which the cumulative fraction Max utilization within 25% of optimal actual demands deviate from the presumed ones.

Figure 5:
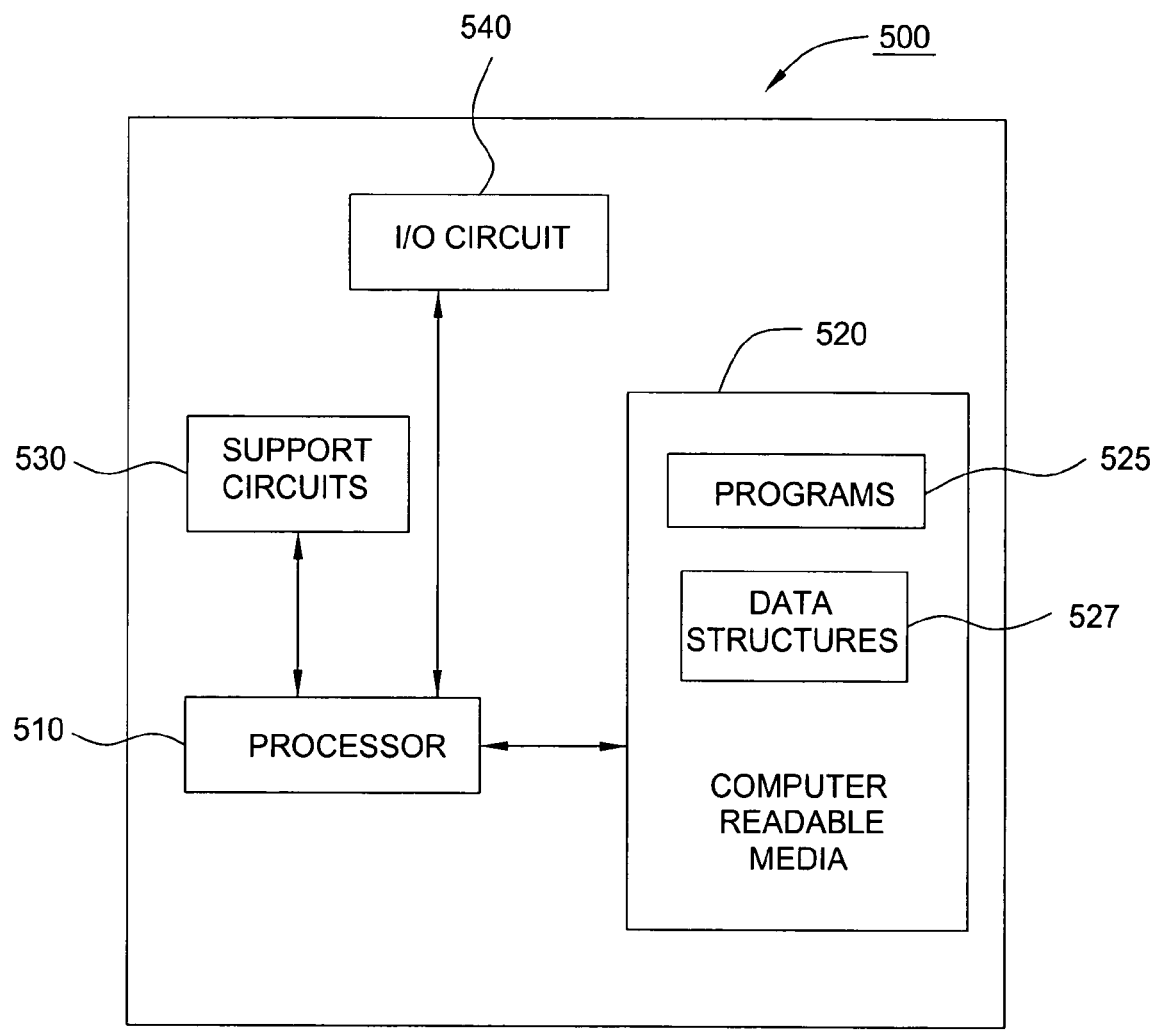
FIG. 5 illustrates a node that is in accord with the principles of the present invention.

FIG. 5 depicts a high level block diagram of a node 500 that is in accord with the principles of the present invention. The node 500 represents a server, e.g. an Asynchronous Transfer Mode (ATM) server, which can be used in a network such as that shown in FIG. 1. The node 500 comprises a processor 510 as well as computer readable medium 520 for storing control programs 525 and data structures 527. The control programs 525 configure the path-based routings of the node 500 in accord with an optimum network routing as described above.

The processor 510 cooperates with conventional support circuitry 530 such as power supplies, clock circuits, cache memory and the like as well as circuits that assist in executing the control programs 525 in the memory 520. As such, it is contemplated that some of the process steps discussed herein as software processes may be implemented within hardware, for example, as circuitry that cooperates with the processor 510 to perform various steps. The node 500 also contains input-output circuitry 540 that forms an interface with other nodes in a network.

Although the node 500 is depicted as having a processor 510 that operates according to a software program, the invention can be implemented in hardware, for example, as an application specified integrated circuit (ASIC). As such, the process steps described herein are intended to be broadly interpreted as being equivalently performed by software, hardware, or a combination thereof. Furthermore, the computer readable media 520 is a computer readable memory that stores information that can be run and/or accessed by the processor 510.

While the foregoing is directed to embodiments of the present invention, other and further embodiments of the invention may be devised without departing from the basic scope thereof, and the scope thereof is determined by the claims that follow.

The invention claimed is:

1. A method of configuring a traffic network, comprising:
obtaining information about a plurality of nodes and a plurality of links in the traffic network;
identifying possible origin-destination pairs;
computing an optimum oblivious ratio of the traffic network; and
configuring the traffic network in accordance with the computed oblivious ratio, wherein said computing the optimum oblivious ratio is performed by solving a linear program, wherein the oblivious ratio is computed using a single LP with $O(mn^2)$ variables and $O(nm^2)$ constraints.

2. The method of claim 1, wherein the $O(nm^2)$ constraints are determined in accordance with:
mm r
$f_{ij}(e)$ is a routing $$\forall \text{ links } l: \sum_m \text{cap}(m)\pi(l,m) < r$$

$\forall$ links l, $\forall$ pairs i→j:
$f_{ij}(l)/\text{cap}(l)-s_i^+(l,j)+s_i^-(l,j)=p_l(l,j)$ $\forall$ links l, $\forall$ nodes l, $\forall$ edges e=j→k:
$\pi(l,\text{link-of}(e))+p_l(i,j)-p_l(i,k)\leq 0$ $\forall$ links l,m: $\pi(l,m)\leq 0$
$\forall$ links l, $\forall$ nodes i:$p_l(i,i)=0$
$\forall$ links l, $\forall$ nodes i,j__$\leq 0$.

3. A method of configuring a traffic network, comprising:
obtaining information about a plurality of nodes and a plurality of links in the traffic network;
identifying possible origin-destination pairs;
computing an optimum network routing; and
configuring the traffic network in accordance with the computed optimum network routing, wherein said computing the optimum network routing is performed by solving a linear program, wherein the optimum network routing is computed using a single LP with $O(mn^2)$ variables and $O(nm^2)$ constraints.

4. The method of claim 3, wherein the $O(nm^2)$ constraints are determined in accordance with:
mm r
$f_{ij}(e)$ is a routing $$\forall \text{ links } l: \sum_m \text{cap}(m)\pi(l,m) < r$$

$\forall$ links l, $\forall$ pairs i→j:
$f_{ij}(l)/\text{cap}(l)-s_i^+(l,j)+s_i^-(l,j)=p_l(l,j)$ $\forall$ links l, $\forall$ nodes l, $\forall$ edges e=j→k:
$\pi(l,\text{link-of}(e))+p_l(i,j)-p_l(i,k)\leq 0$ $\forall$ links l,m: $\pi(l,m)\leq 0$
$\forall$ links l, $\forall$ nodes i: $p_l(i,i)=0$
$\forall$ links l, $\forall$ nodes i,j__<0.

5. A traffic network comprised of:
a plurality of routers that support path-based routing and a plurality of links that connect the plurality of routers, wherein each path-based routing is configured in accordance with an oblivious routing configuration based on the plurality of routers and links, wherein the oblivious routine configuration is derived by identifying possible origin-destination pairs, computing an optimum network routing based on linear constraints placed on origin-destination pair demands, and configuring the path-based routing in accordance with the optimum network routing, wherein the optimum network routing is computed using a single LP with $O(mn^2)$ variables and $O(nm^2)$ constraints.

* * * * *